United States Patent [19]
Robolin

[11] Patent Number: 5,845,788
[45] Date of Patent: Dec. 8, 1998

[54] BICYCLE STORAGE AND DISPLAY SYSTEM

[75] Inventor: Claude J. Robolin, Lavonia, Ga.

[73] Assignee: RHC/Spacemaster Corporation, Lavonia, Ga.

[21] Appl. No.: 820,539

[22] Filed: Mar. 19, 1997

[51] Int. Cl.$^6$ ..................................................... A47F 7/00
[52] U.S. Cl. ........................ 211/17; 211/1.51; 211/1.57; 211/121
[58] Field of Search ............................ 312/268; 211/1.51, 211/1.56, 1.57, 17, 20, 117, 121

[56] References Cited

U.S. PATENT DOCUMENTS

| | | | |
|---|---|---|---|
| 579,584 | 3/1897 | Jessup | 211/17 |
| 581,803 | 5/1897 | Armstrong | 211/17 X |
| 1,542,817 | 6/1925 | Berheim . | |
| 3,872,972 | 3/1975 | Cummins et al. | 211/117 X |
| 3,924,751 | 12/1975 | Ballenger | 211/117 X |
| 5,040,689 | 8/1991 | Hull et al. | 211/121 |
| 5,431,493 | 7/1995 | Larson | 312/268 |

OTHER PUBLICATIONS

*Verti–Store Motorized Back Room Rack for Apparel Storage and Retrieval,* advertising leaflet from Spacemaster Systems, A Division of RHC/Spacemaster Corporation, pp. 1–5, undated, but published prior to Jan. 1, 1996.

*Primary Examiner*—Robert W. Gibson, Jr.
*Attorney, Agent, or Firm*—Laff, Whitesel, Conte & Saret, Ltd.

[57] ABSTRACT

A bicycle storage and display system having a frame, a first chain mounted on a first side, and a second chain mounted on a second side of the frame. A plurality of sprockets rotatably support the first and second drive chains. The sprockets are arrayed to support the drive chains for concurrent movement in parallel vertical planes. A plurality of elongated, horizontally positioned support bars having first and second ends supported, respectively, on the first and second drive chains, support a plurality of horizontally spaced bicycles thereon. A plurality of two point bicycle hangers are suspended from the support bars, means on each of the hangers releasably engage each bicycle at two points thereon to secure and suspend the bicycles in a generally horizontal orientation for storage and display and for releasing the bicycles for ready removal therefrom.

23 Claims, 8 Drawing Sheets

BICYCLE STORAGE AND DISPLAY SYSTEM

FIELD OF THE INVENTION

This invention relates to storage and display systems. More particularly, this invention relates to a system for securely suspending bicycles horizontally for storage and display and for readily releasing the suspended bicycles for their removal therefrom.

BACKGROUND OF THE INVENTION

Conventional racking systems for retail facilities generally include multi-level racks for storing hangered items. These systems utilize large amounts of floor space and often waste valuable vertical space. In addition, store personnel are usually required to use potentially dangerous means such as, for example, walkways, mezzanines, catwalks and/or ladders to gain access to the stored merchandise on the racks.

At least one system has been developed to overcome some of the deficiencies of the prior art. This system, which allows for the horizontal storage and movement of hangered items, includes opposed motorized chain track assemblies having horizontally disposed rods which are mounted thereon. Items such as hangered apparel are suspended on the rods which, in turn, are moved vertically by the chain track assemblies in a ferris wheel type track.

A variation of the above-described system has been similarly employed for storing and displaying bicycles. Specifically, bicycles are suspended by single hooks from rods mounted on chain track assemblies. Such hooks extend through either the front or rear wheel, and the bicycles therefore hang in a generally vertical orientation. As a result of their vertical orientation, the bicycles are poorly displayed, have generally inadequate ground level accessibility, and are difficult and heavy to remove from the hooks.

Accordingly, an object of the present invention is to provide a bicycle storage and display system which suspends bicycles in a generally horizontal orientation and allows the bicycles to be viewed in that attractive orientation, namely in the position that they assume during use.

Another object of the present invention is to provide a bicycle storage and display system with excellent ground level accessibility which facilitates the ready removal of the bicycles from the storage system and which minimizes the likelihood of personnel injuries as bicycles are removed therefrom.

A further object of the present invention is to provide a bicycle storage and display system which provides enhanced securance against unintentional detachment of bicycles.

Yet another object of the present invention is to provide a bicycle storage and display system which maximizes the efficiency of use of vertical and horizontal storage space.

SUMMARY OF THE INVENTION

In accordance with the present invention, an improved bicycle storage and display system is provided. The system comprises a frame having a first side and a second side. A first drive chain is mounted on the first side and a second drive chain is mounted on the second side of the frame. A plurality of sprockets for rotatably supporting the first drive chain on the first side of the frame and the second drive chain on the second side of the frame, are provided and arrayed to support the chains for concurrent movement in parallel vertical plans. The system further includes means for driving the chains in the vertical planes. The system comprises a plurality of elongated, horizontally positioned support bars having first and second ends supported, respectively, on the first and second chains, each of the support bars being adapted to support a plurality of horizontally spaced bicycles thereon, and a plurality of two point bicycle hangers suspended from the support bars. Means are further provided on each of the hangers for releasably engaging a bicycle at two points thereon, the engaging means securing and suspending a bicycle in a generally horizontal orientation for storage and display and for releasing a bicycle for ready removal therefrom. Each of the bicycle hangers is attached to a support bar by a bar mounting plate.

In a preferred form, the engaging means comprises a first hook assembly and a second hook assembly, the first hook assembly being adapted to releasably engage the handle bars of a bicycle and the second hook assembly being adapted to releasably engage a seat of a bicycle. Desirably, each of the hangers includes a front end and rearwardly spaced rear end, the first hook assembly being slidably mounted adjacent the front end of the hanger and the second hook assembly being slidably mounted adjacent the rear end of the hanger when a bicycle is suspended in a horizontal position for storage and display.

The first hook assembly may comprise a hanger mounting mechanism, inner hooks, and outer hooks, the inner and outer hooks being pivotally attached at one end to the hanger mounting mechanism and cooperating with each other at an opposite working end for releasably engaging the handle bars of the bicycles. In a preferred form the outer hooks each comprise a pair of spaced and parallel hook members, the inner hooks each being interconnected by a strut and the outer hooks each being interconnected by a strut, and wherein the working ends of the outer hooks and the working ends of the inner hooks curve inwardly towards one another to prevent the handle bars from inadvertently unhooking from the hooks when a bicycle is suspended in the horizontal storage and display position.

The second hook assembly may comprise a hanger mounting mechanism and a pair of hooks pivotally attached at one end to the mounting mechanism, with the hooks being spaced and parallel to one another and interconnected by a strut. Preferably the bicycle and storage display system includes a safety strap attached to and extending from the second hook assembly to a portion of the bicycle frame adjacent the bicycle seat. In one form the second hook assembly releasably engages the back portion of the bicycle seat.

Desirably, the second hook assembly is mounted to slide along the bicycle hanger towards the first hook assembly after a bicycle has been released from the first hook assembly during its removal from the hanger. The two-point bicycle hangers are spaced alternatively close to and away from the support bar for maximizing the number of bicycles which can be stored and displayed side by side on a support bar at any one time.

The above, as well as other objects, features and advantages of the invention, will become apparent from the following detailed description of a preferred embodiment, reference being made to the accompanying drawings.

DETAILED DESCRIPTION OF THE INVENTION

Referring now to the drawings, the bicycle storage and display system 20 comprises a plurality of horizontally disposed support bars 22 which are mounted on motorized and opposing chain track assemblies 24, 25 which, in turn, are mounted on a frame 26. Bicycles B are suspended horizontally by a plurality of two point bicycle hangers 30 which are attached to the support bars 22.

Figure 1:
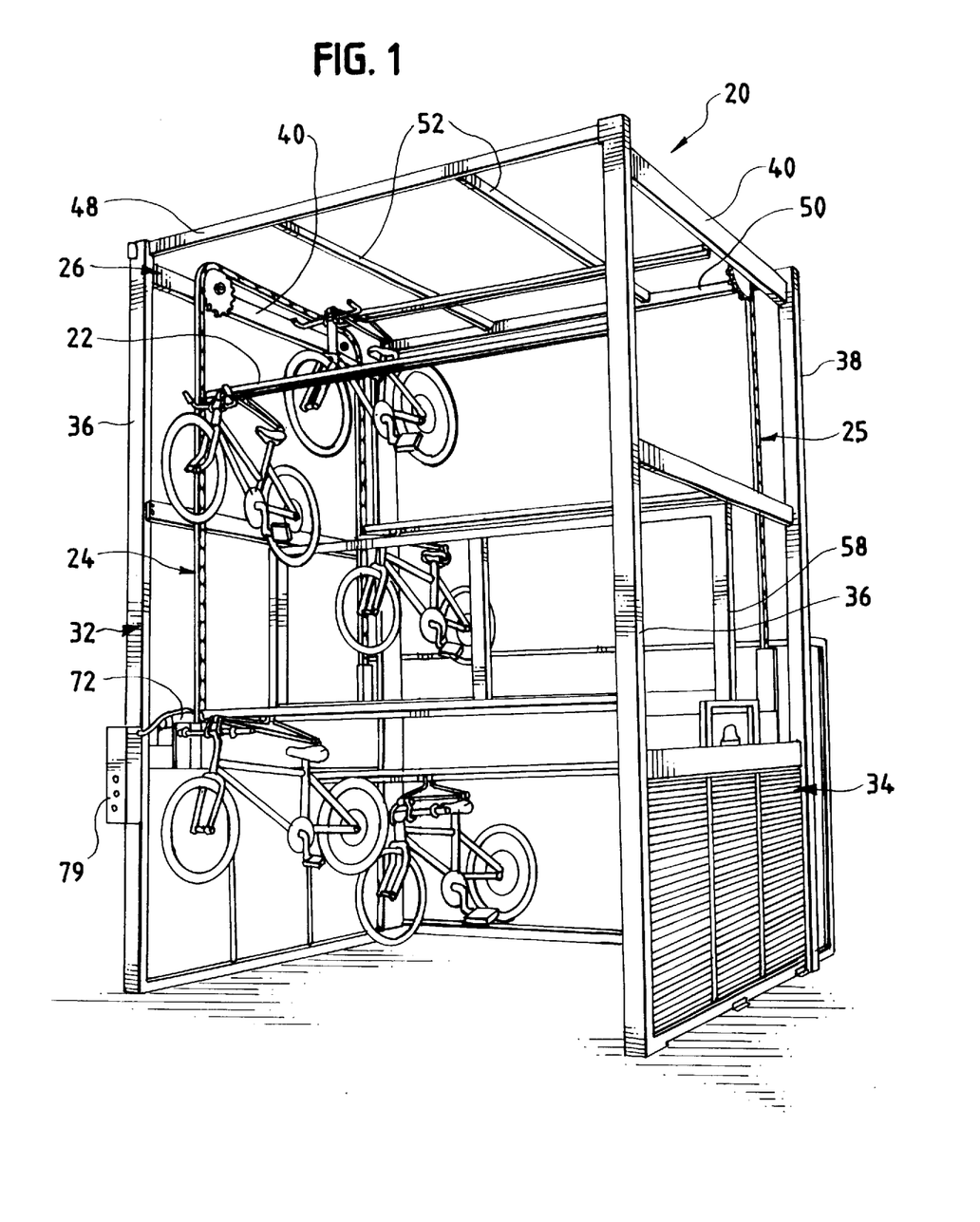
FIG. 1 is a front perspective view of the frame of a bicycle storage and display system of the present invention.

Frame 26 includes a first side frame assembly 32 and a second side frame assembly 34. Each side frame assembly 32, 34 includes left and right floor-supported column members 36 and 38, respectively, and a top member 40. A pair of top frame members 48, 50 extend between and connect the first and second side frame assemblies together. Support struts 52 may be positioned between the top frame members 48, 50 to rigidify and strengthen them. Similar struts (not shown) may be provided between the left and right column members. The first and second side frame assemblies 32, 34 of frame 26 are each substantially enclosed by a rectangular housing (not shown), respectively. Additional struts 58 positioned between the columns may be used to provide additional rigidity for the support structure.

First chain assembly 24 includes chain 66 mounted on the first side frame assembly 32 and a second chain track assembly 25 includes chain 68 mounted on second side frame assembly 34. A plurality of sprockets 70 are provided to rotatably support first drive chain 66 and second drive chain 68. Sprockets 70 are arrayed to support the chains for concurrent movement in parallel vertical planes. The first and second chains 66, 68 and chain assemblies 24, 25 are preferably identical.

A drive means 72 is mounted on one or both of the side frame assemblies for driving the vertical chains 66, 68.

Drive means 72 comprises a reversible motor or other comparable power unit and gearing which engages and drives the first and second drive chain assemblies and the associated elongated, horizontally positioned support bars 22. Support bars 22 have first and second ends, respectively, which are secured to the first and second chains at their respective ends by mounting plates 74. An electrical control panel 79 mounts a switch to operate the reversible motor so that it may vertically position selected support bars 22 relative to the ground G.

Figure 4:
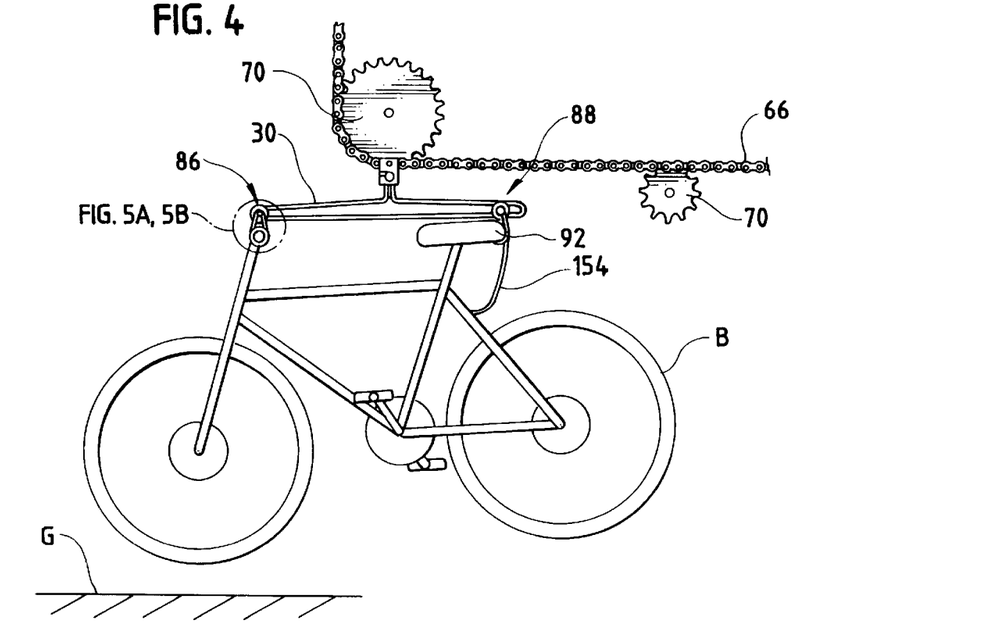
FIG. 4 is a fragmentary side view of FIG. 2.
Figure 4A:
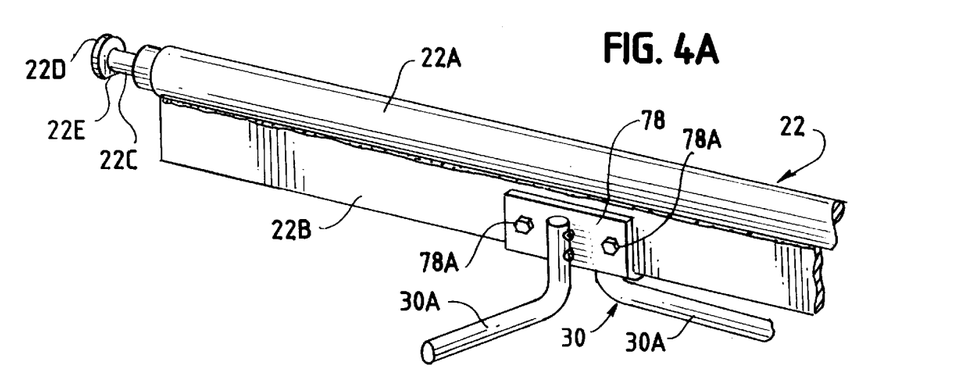
FIG. 4A is a fragmentary perspective view of a support bar and bicycle hanger.
Figure 13:
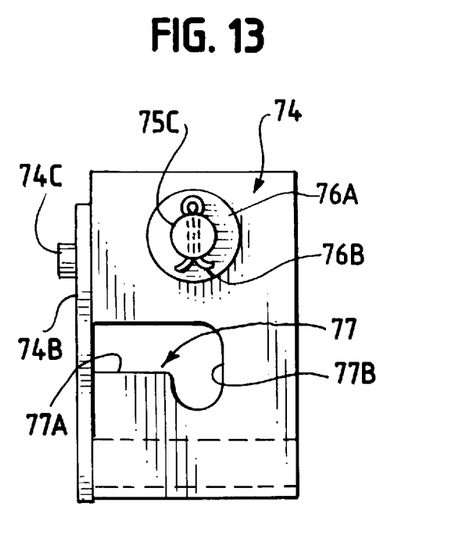
FIG. 13 is a front elevational view of one of a pair of mounting plate assemblies for securing a support bar to a pair of vertical chains.
Figure 14:
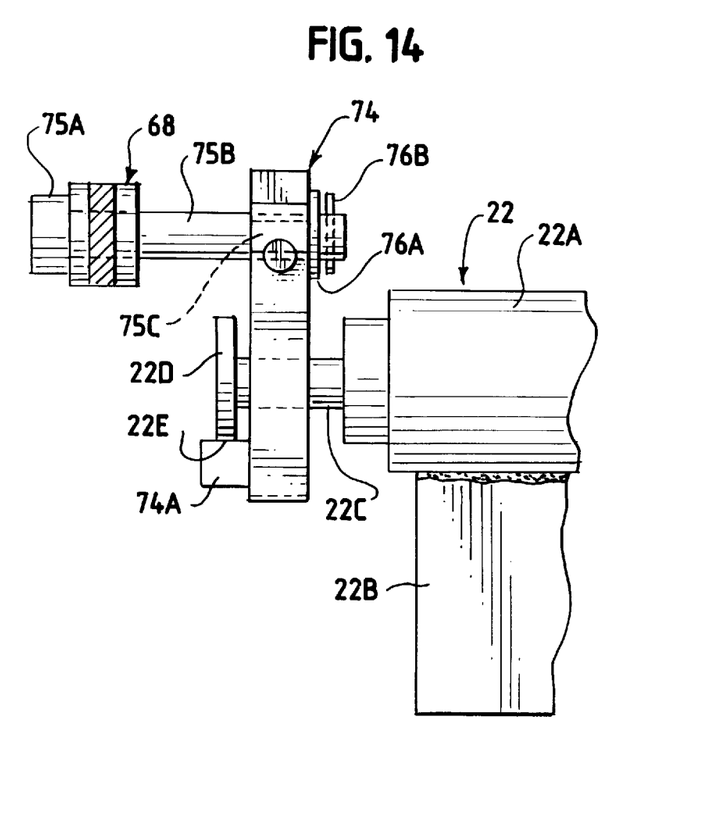
FIG. 14 is a side elevational view of the mounting plate assembly of FIG. 13.

As best seen from FIGS. 4A, 13 and 14, each support bar 22 comprises a circular rod 22A and a plate 22B secured thereto, as by welding. Plate 22B may be flat and rectangular in cross-section. Each end of support bar 22 defines a reduced diameter axle 22C which is adapted to be supported from one of the chains 66, 68 by a mounting plate 74. At the end of axle 22C a stop 22D is provided. Stop 22D is enlarged and is generally circular, but desirably is provided with a chordal flat 22E to help orient the support bar relative to the chain.

As may be seen from FIGS. 13 and 14 each, mounting plate 74 comprises a body which is generally rectangular in cross-section. It is secured to a chain 66 (or 68) by a pin 75 having a head 75A, a shank 75B with a reduced diameter shank portion 75C rotatably journalled in plate 74. The pin 75 is retained in juxtaposition with the plate 74 by a washer 76A and cotter pin 76B.

Plate 74 defines a generally L-shaped slot 77. Slot 77 has a generally horizontal or rearwardly extending section 77A and a downwardly extending section 77B. When the axles 22C of a rod 22 are moved to their innermost positions relative to plates 74, they will be seated in sections 77B. The base of sections 77B are preferably semi-circular to mate appropriately with the cylindrical axles 22C when they are seated therein.

When the axles 22C are so seated, the stops 22D, which are enlarged relative to the size of the slots 77, will limit any possible movement of the support bars 22 laterally. Additionally, the chordal flats 22E confront and engage the orientation plate 74A which is fixed to plate 74 as by welding, bolting or in an otherwise suitable manner. Plate 74A provides a flat surface with which the chordal flat 22E engages thereby to fixedly orient the bar, hence the hanger plate 22B as it was designed to be disposed as the support bars move with the chains through a cycle. Finally, to keep the support bar axles within the mounting plates 74, keepers 74B are secured, as by threaded fasteners 74C, to cover the entryways to the slots 77.

Figure 2:
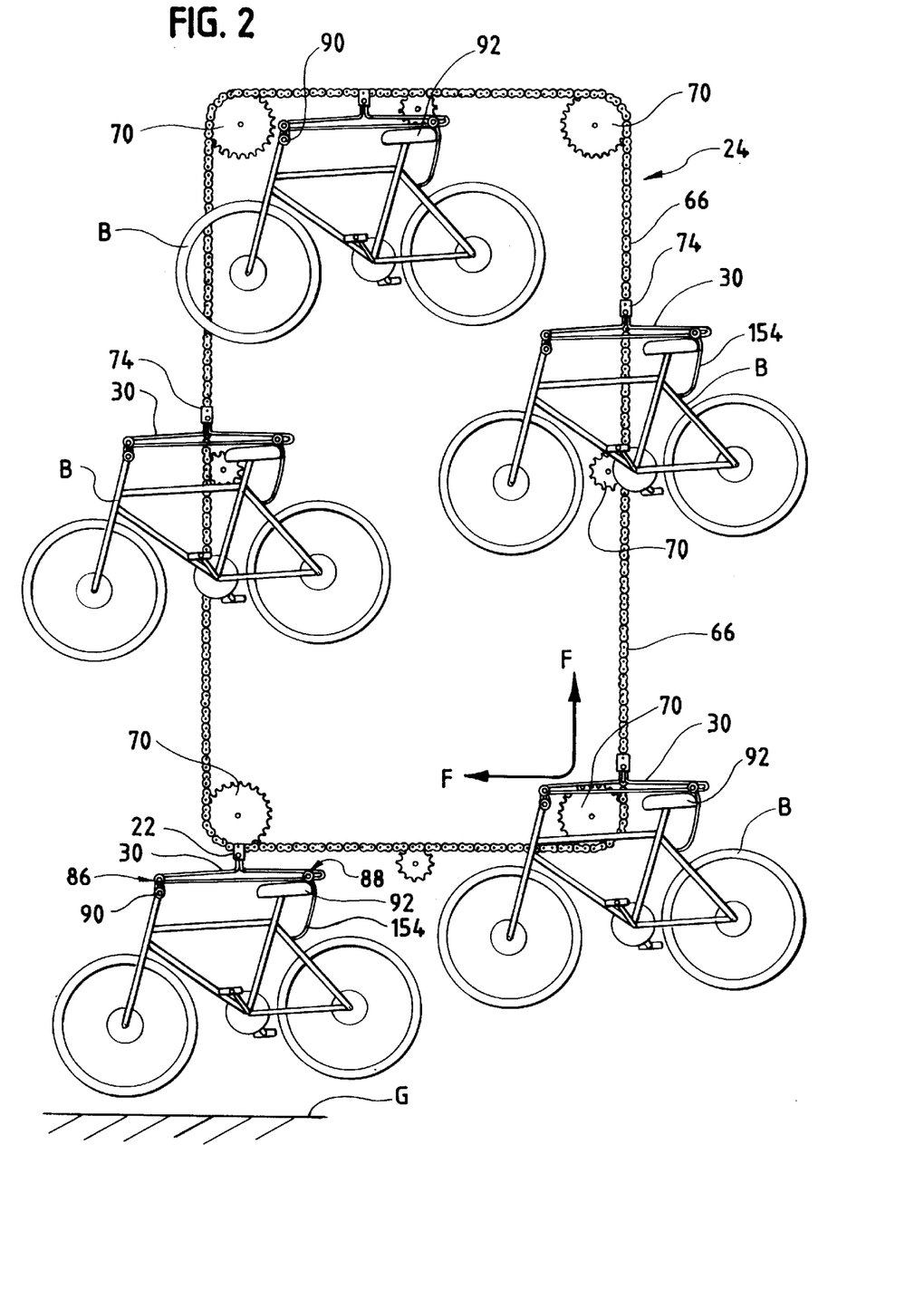
FIG. 2 is a fragmentary side elevational view of the bicycle storage and display system of FIG. 1.
Figure 3:
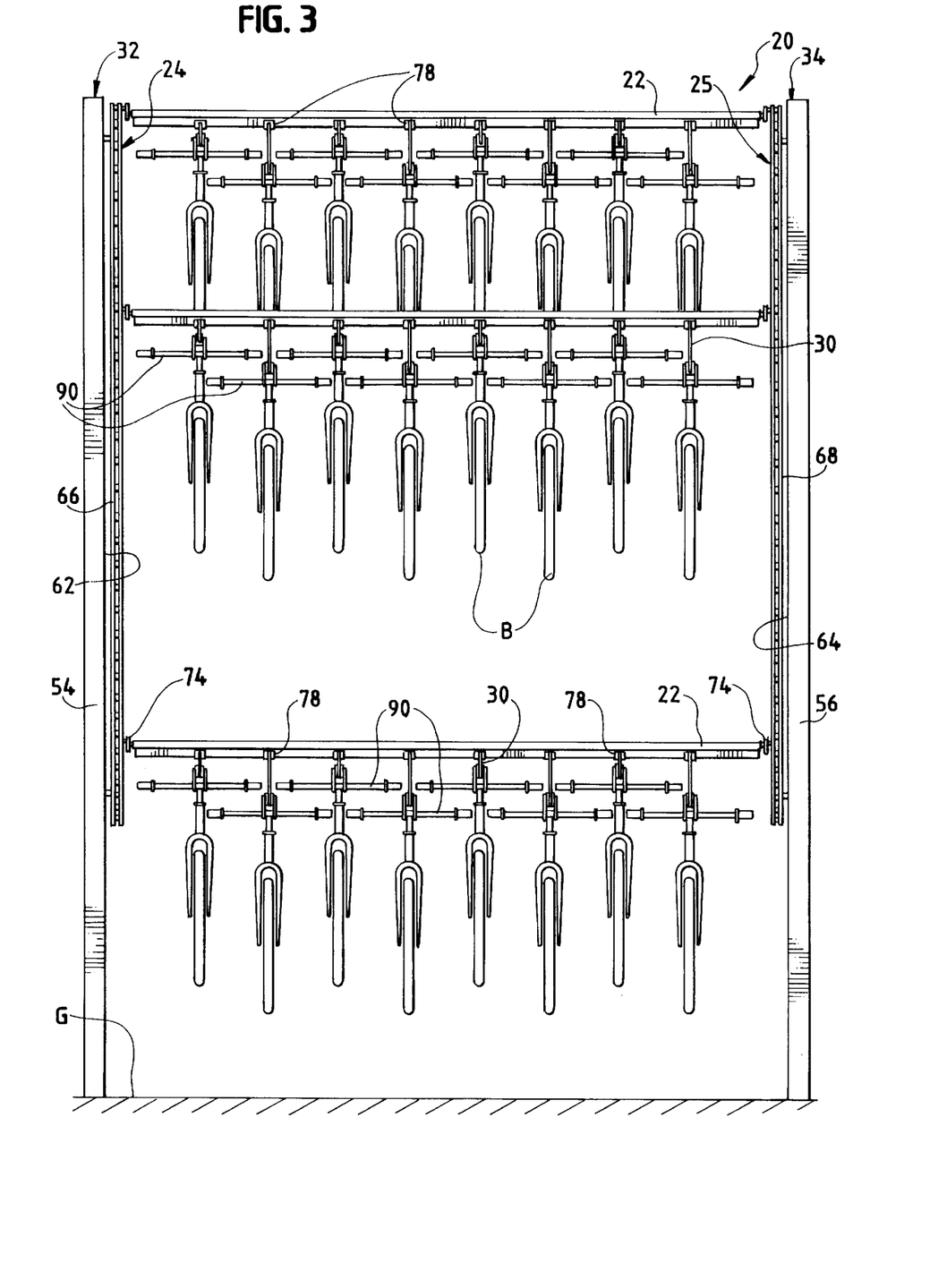
FIG. 3 is a fragmentary front elevational view of the storage and display system of FIG. 1.

As best seen from FIGS. 1–3, a plurality of spaced bicycle hangers 30 are suspended from each of the support bars 22. The bicycle hangers are attached to support bars 22 by saddles or bar mounting plates 78. Support assemblies are provided on each hanger 30 for releasably engaging a bicycle B at two points thereon. The support assemblies secure and suspend a bicycle in a generally horizontal orientation for storage and display, and for facilitating release of the bicycles for ready removal therefrom. Hangers 30 are preferably wire form members having a substantially horizontal base section 30A, returns at the ends of section 30A, and overlying legs 30B which cooperate with base section 30A to retain the rollers on the support assemblies. The innermost free ends of the legs 30 are bent upwardly to provide stubs 30C which are welded to plates 78. Plates 78 are secured, as by threaded fasteners 78A to the support bar plates 22B.

The support assemblies may comprise a first hook assembly 86 and a second hook assembly 88. First hook assembly 86 releasably engages the handle bars 90 of a bicycle B and second hook assembly 88 releasably engages a seat 92 of a bicycle B. Each of first hook assembly 86 and second hook assembly 88 are slidably mounted on hanger 30. First hook assembly 86 is adapted to be positioned adjacent to the front of hanger 30 and second hook assembly 88 is adapted to be positioned adjacent the rear of hanger 30 when the bicycles are in the horizontal, suspended positions for storage and display.

First support or hook assembly 86 comprises, in part, a pair of rear or inner hooks 100, and a pair of front or outer hooks 102 (FIGS. 9–10), each pair of hooks being connected by a strut 124. Hook assembly 86 further includes a roller 104 which defines a central bore 106 and a circumferentially extending, centrally located groove 108. An internally threaded collar 110 is inserted into bore 106 and the inner and outer hooks 100, 102 are pivotally mounted at their pivot ends 112, 114, respectively, to the hanger support assembly via threaded bolts 116. Washers 118 are placed as shown in the drawings. The inner and outer hooks 100, 102 of the first hook assembly 86 are spaced but parallel to one another.

Figures 9, 10:
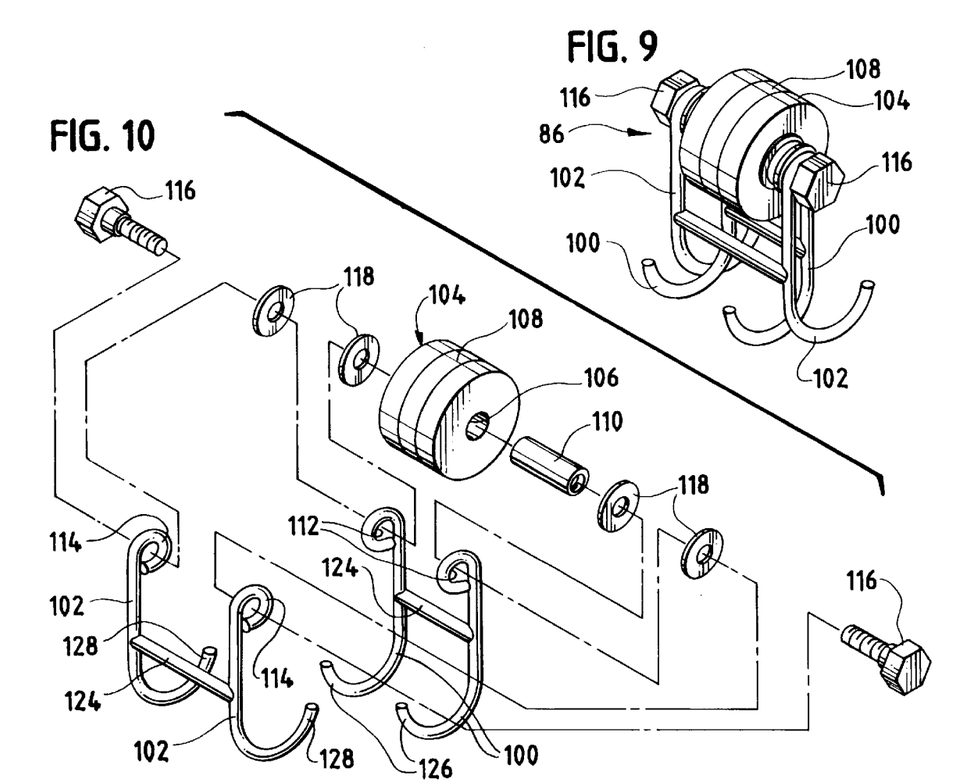
FIG. 9 is a perspective view of the handle bar support assembly.
FIG. 10 is an exploded perspective view of the assembly of FIG. 9.

Roller 104 is mounted adjacent the front of the hanger 30 with the working ends 126 of inner hooks 100 being forwardly directed and the working ends 128 of outer hooks 102 being rearwardly directed. The roller 104 rides on base section 30A and captures the hanger 30 within groove 108 to maintain securance therebetween. The inner hooks 100 and outer hooks 102 cooperate with each other at their working ends for releasably engaging the handle bars 90 of a bicycle so that a bicycle B may be suspended thereby.

In that regard, outer hooks 102 provide additional support for handle bars 90 and prevent the handle bars from inadvertently unhooking from inner hooks 100 when a bicycle is suspended in the horizontal storage and display position.

Figure 11:
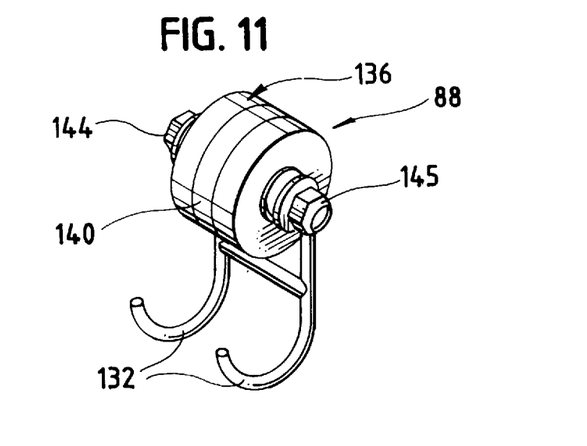
FIG. 11 is a perspective view of the rear seat support assembly.
Figure 12:
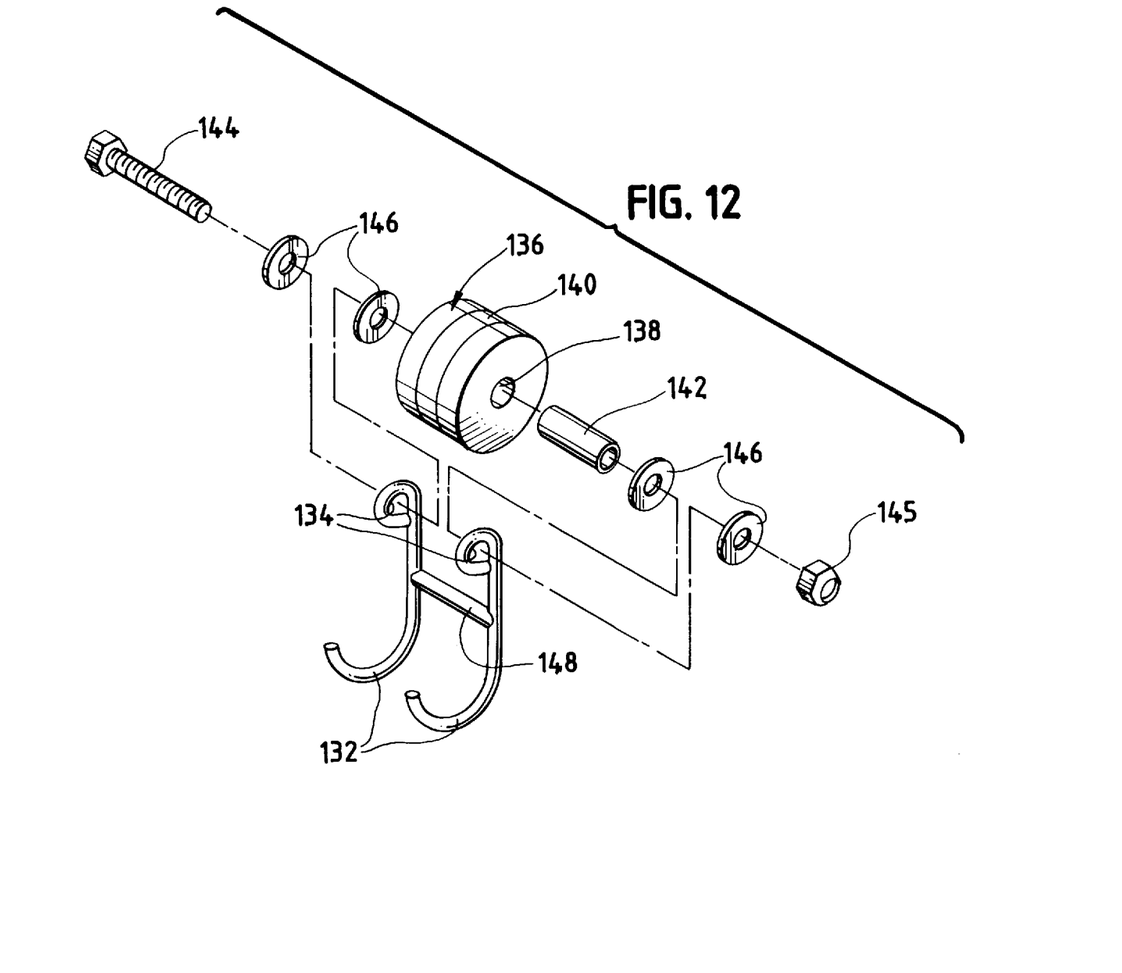
FIG. 12 is an exploded perspective view of the assembly of FIG. 11.

Second support or hook assembly 88 comprises a pair of hooks 132 which are pivotally attached at pivot ends 134 to the hook assembly (FIGS. 11–12). Hanger mounting mechanism 130 also includes a roller 136 that defines a central bore 138 and a circumferentially extending and centrally located groove 140. A collar 142 is inserted into bore 138 and hooks 132 are pivotally attached at their pivot ends 134 adjacent roller 136. A bolt 144 (with locking nut 145) is threaded into collar 142 on each side of the roller to secure hooks 132 on bolt 144. A washer 146 is placed on each side of pivot ends 134 of hooks 132 and against each side of roller 136. Hooks 132 are spaced but parallel to one another, as well as being interconnected by a strut 148. The hooks are proportioned and adapted to releasably engage and hook under the back portion of the bicycle seat (FIG. 4).

Figure 6:
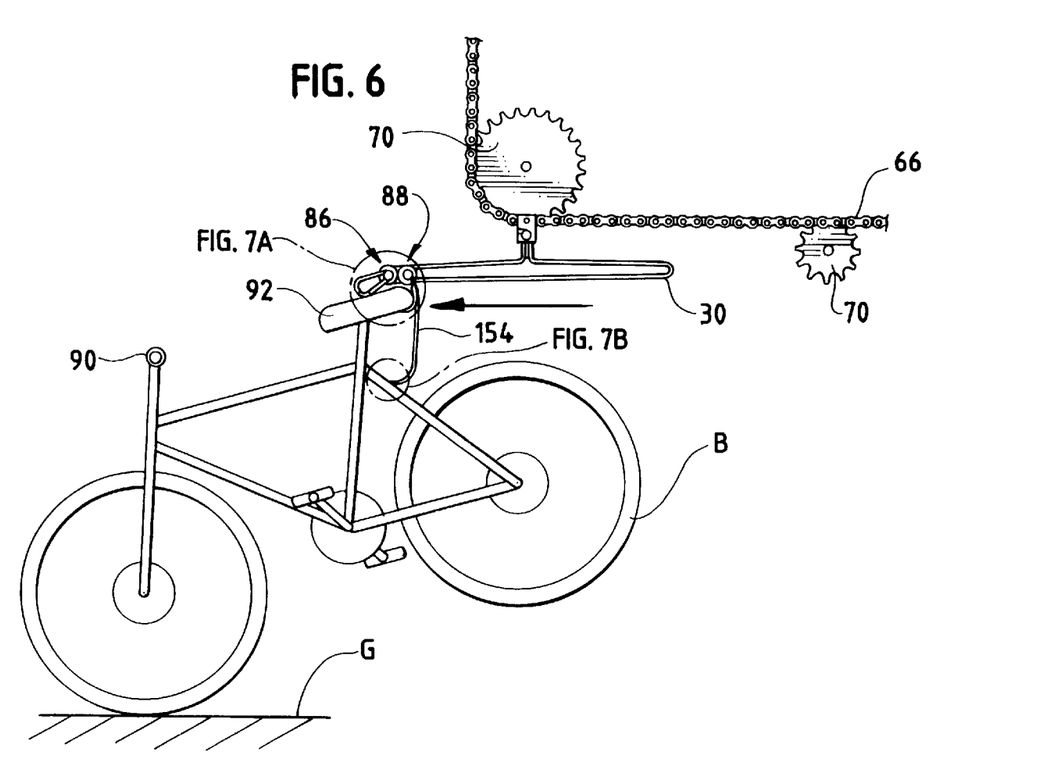
FIG. 6 is a fragmentary side view of FIG. 2, illustrating a bicycle removed from the first support assembly.

Roller 136 of second hook assembly 88 is mounted adjacent rear end 96 of hanger 30 with the ends of hooks 132 being forwardly directed, and in the direction of the first hook assembly 86 (FIGS. 2, 4). Groove 140 captures the hanger 30 and thereby securely maintains roller 136 on base section 30A of hanger 30. A safety strap 154 is attached to, and extends from strut 148 between hooks 132 to a portion of the bicycle frame adjacent the bicycle seat (FIGS. 6, 7B) and may include a snap for facilitating the encirclement of that portion.

Figure 5A:
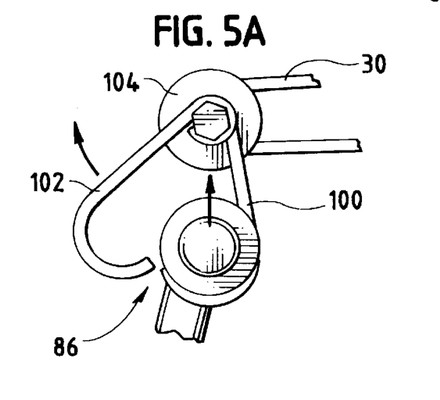
FIGS. 5A and 5B are fragmentary views of FIG. 4, illustrating the handle bar support assembly in partially released and fully released positions, respectively.
Figure 5B:
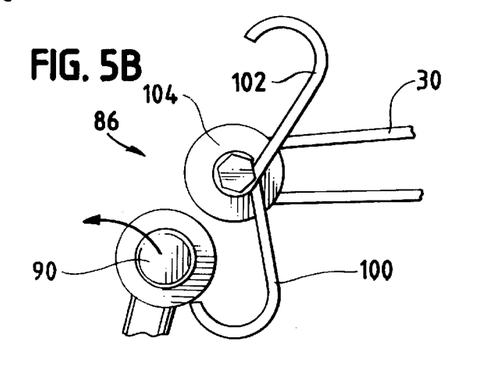
Figure 7A:
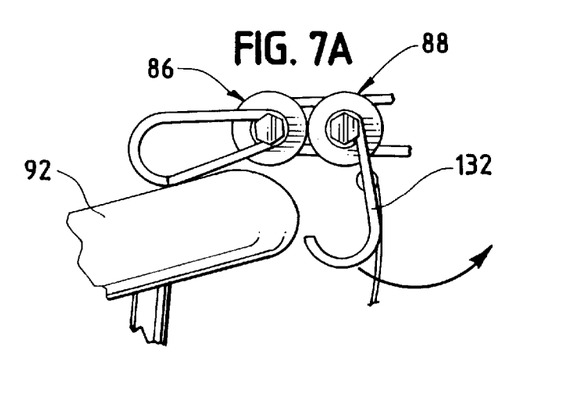
FIGS. 7A and 7B are fragmentary views of FIG. 6, illustrating the rear bicycle seat support assembly in a released condition and the safety strap ready to be detached from the bicycle strut, respectively.
Figure 7B:
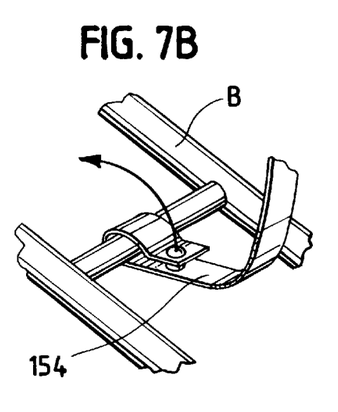
Figure 8:
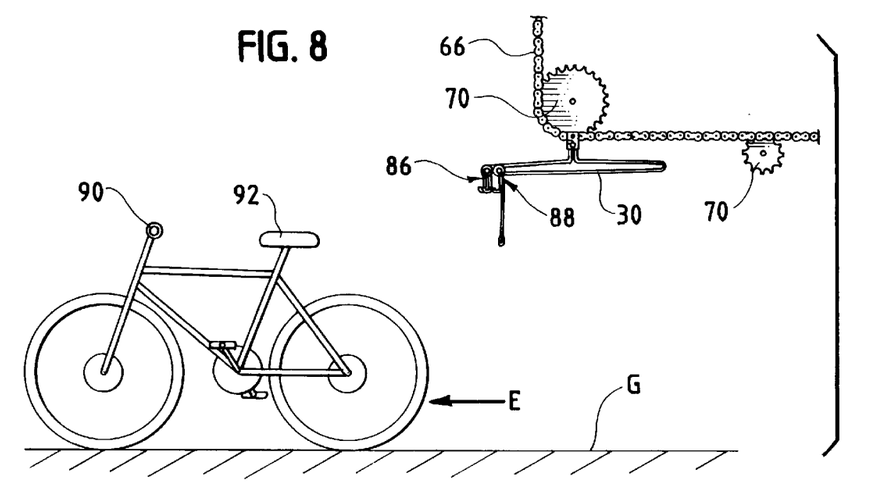
FIG. 8 is a fragmentary side view of FIG. 2, illustrating a bicycle as released from the two point bicycle hanger.

In use, a user actuates the drive means 72, as by pressing a suitable actuation button on the electrical control panel 79 which causes the chains 66, 68 to be driven and the associated support bars 22 to be transported around the frame assembly. When the user desires to remove a selected bicycle from the support bar, the support bars are rotated via the chain assemblies until the horizontally suspended selected bicycle on the associated support bar is as close to the ground G as possible. The drive means is then stopped via the control panel. The user then slightly lifts up the selected bicycle by its handle bars and releases inner and outer hooks of first hook assembly 86, as illustrated by FIGS. 5A and 5B. The bicycle is then lifted up and out from the first hook assembly, and the front wheel of the bicycle is positioned on the floor. With the front tire resting on the floor, the bicycle is pulled forward to bring the second hook assembly 88 forwardly within the bicycle hanger 30 towards the first hook assembly (See FIG. 6). Next, the user unfastens the safety strap 154 from the bicycle frame (FIG. 7B). Finally, the bicycle seat is lifted up and out of engagement with the hooks of the second hook assembly 88 (FIG. 7A) and the rear wheel is lowered to the ground. The bicycle is then pulled forward to clear the bicycle from the display system 20 and from the remaining suspended bicycles, as indicated by arrow E in FIG. 8. These steps are reversed to place a bicycle on a support bar of the display system.

In a preferred embodiment, the horizontally oriented bicycles are alternatively spaced closer to and away from an associated support bar 22 for maximizing the number of bicycles which may be stored side-by-side and displayed on a support bar at any given time. In addition, the drive means 72 preferably rotates the bicycles either forward or backward on the chain assemblies 24, 25 as indicated by arrows in FIG. 2.

The display system of the present invention may also be used to store, display, lift, or otherwise convey other types of removable products which will benefit from a two-point attachment for support and display.

The frame 26 and support bars 22 are preferably made of steel, but may alternatively be made of any other similarly rugged material. Hangers 30 are made of plastic or a lightweight metal. First and second hook assemblies 86, 88 are also preferably made of a lightweight metal, while rollers 104, 136 are preferably made of a plastic. Although the storage and display system has not been described in terms of approximate measurements, as it should be understood that the dimensions of the system may vary, as may the number of support rods per unit, so that a system may be precisely tailored according to need.

This motorized may be powered by a standard 220 volt 2.6 AMP electrical hook-up. All controls meet appropriate safety standards.

While the invention has been described in relation to a preferred embodiment thereof, those skilled in the art will appreciate that a wide variation of structural details may be developed without departing from the spirit, scope and principles of the invention. Accordingly, the appended claims are to be construed to cover all equivalents falling within the scope and spirit of the invention.

What is claimed is:

1. A bicycle storage and display system comprising:
   a frame having a first and second side;
   a first drive chain mounted on said first side and a second drive chain mounted on said second side of said frame;
   a plurality of sprockets for rotatably supporting said first drive chain on said first side of said frame and said second drive chain on said second side of said frame, said sprockets being arrayed to support said chains for concurrent movement in parallel vertical planes;
   means for driving said drive chains in said vertical planes;
   a plurality of elongated, horizontally positioned support bars having first and second ends supported, respectively, on said first and second drive chains, said support bars being adapted to support a plurality of horizontally spaced bicycles thereon;

a plurality of two point bicycle hangers suspended from said support bars; and means on each of said hangers for releasably engaging each bicycle at two points thereon, said engaging means securing and suspending the bicycles in a generally horizontal orientation for storage and display and for releasing a bicycle for ready removal therefrom.

2. The bicycle and storage display system of claim 1 wherein each of said bicycle hangers is attached to said support bar by a bar mounting plate.

3. The bicycle and storage display system of claim 1 wherein said engaging means comprises a first hook assembly and a second hook assembly, said first hook assembly being adapted to releasably engage the handle bars of a bicycle and said second hook assembly being adapted to releasably engage a seat of a bicycle.

4. The bicycle and storage display system of claim 3 wherein each of said hangers includes a front end and a rearwardly spaced rear end, said first hook assembly being slidably mounted adjacent the front end of the hanger and said second hook assembly being slidably mounted adjacent the rear end of the hanger when a bicycle is suspended in a horizontal position for storage and display.

5. The bicycle and storage display system of claim 3 wherein said first hook assembly comprises a hanger mounting mechanism, inner hooks, and outer hooks, said inner and outer hooks being pivotally attached at one end to said hanger mounting mechanism and cooperating with each other at opposite working ends for releasably engaging the handle bars of a bicycle.

6. The bicycle and storage display system of claim 5 wherein said inner hooks and said outer hooks each comprise a pair of spaced and parallel hook members, said inner hooks each being interconnected by a strut and said outer hooks each being interconnected by a strut.

7. The bicycle and storage display system of claim 5 wherein the working ends of said outer hooks and the working ends of said inner hooks curve inwardly towards one another to prevent the handle bars of a bicycle from inadvertently unhooking from said hooks when a bicycle is suspended in the horizontal storage and display position.

8. The bicycle and storage display system of claim 3 wherein said second hook assembly comprises a hanger mounting means and a pair of hooks pivotally attached at one end to said mounting means.

9. The bicycle and storage display system of claim 8 wherein said hooks are spaced and parallel to one another, said hooks being interconnected by a strut.

10. The bicycle and storage display system of claim 3 further comprising a safety strap attached to and extending from said second hook assembly to a portion of the bicycle frame adjacent to said bicycle seat.

11. The bicycle and storage display system of claim 3 wherein said bicycle seat includes front and back portions, and said second hook assembly being adapted to releasably engage the back portion of said bicycle seat.

12. The bicycle and storage display system of claim 8 wherein said second hook assembly is mounted to slide along said bicycle hanger towards said first hook assembly after a bicycle has been released from the first hook assembly during its removal from said hanger.

13. The bicycle and storage display system of claim 1 wherein said two point bicycle hangers are spaced alternatively close to and away from said support bar for maximizing the number of bicycles which can be stored and displayed side by side on a support bar at any one time.

14. In an assembly for horizontally suspending a bicycle from a storage and display system of the type having spaced first and second drive chains mounted on a frame and being adapted to concurrently move in vertical planes, and a plurality of elongated, horizontally positioned support bars having first and second ends supported, respectively, on said first and second drive chains, a plurality of two point bicycle hangers suspended from said support bars; and means on each of said hangers for releasably engaging a bicycle at two points thereon, said engaging means being adapted for securing and suspending a bicycle in a generally horizontally orientation for storage and display and for releasing a bicycle for ready removal therefrom.

15. The bicycle and storage display system of claim 14 wherein each of said bicycle hangers is attached to a support bar by a bar mounting plate.

16. The bicycle and storage display system of claim 14 wherein said engaging means comprises a first hook assembly and a second hook assembly, said first hook assembly being adapted to releasably engage the handle bars of a bicycle and second hook assembly being adapted to releasably engage a seat of a bicycle.

17. The bicycle and storage display system of claim 16 wherein each of said hangers includes a front end and a rearwardly spaced rear end, said first hook assembly being slidably mounted adjacent the front end of the hanger and said second hook assembly being slidably mounted adjacent the rear end of the hanger when a bicycle is suspended in a horizontal position for storage and display.

18. The bicycle and storage display system of claim 16 wherein said first hook assembly comprises a hanger mounting mechanism, inner hooks, and outer hooks, said inner and outer hooks being pivotally attached at one end to said hanger mounting mechanism and cooperating with each other at opposite working ends for releasably engaging the handle bars of a bicycle.

19. An improved assembly for supporting a bicycle on a storage and display system of the type having a frame with a first and second side, a first drive chain mounted on the first side and a second drive chain mounted on the second side of the frame, a plurality of sprockets for rotatably supporting the first drive chain on the first side of the frame and the second drive chain on the second side of the frame, the sprockets being arrayed to support the drive chains for concurrent movement in parallel vertical planes, means for driving said chains in said vertical planes, a plurality of elongated, horizontally positioned support bars having first and second ends supported, respectively, on the first and second drive chains, the support bars being adapted to support a plurality of horizontally spaced bicycles thereon, wherein the improvement comprises:

a plurality of two point bicycle hangers suspended from said support bars; and means on each of said hangers for releasably engaging a bicycle at two points thereon, said engaging means securing and suspending the bicycle in a generally horizontal orientation for storage and display and for releasing said bicycle for ready removal therefrom.

20. In an assembly for horizontally suspending a bicycle from a storage and display system of the type having spaced first and second drive chains mounted on a frame and being adapted to concurrently move in vertical planes, and a plurality of elongated, horizontally positioned support bars having first and second ends supported, respectively, on said first and second drive chains, a plurality of bicycle hangers suspended from each said support bar; and means for mounting each support bar to each of said first and second drive chains, said mounting means comprising an axle at the end of each support bar and an enlarged stop at the end of each axle, a pair of mounting plates secured to the chains, one mounting plate being located at each end of each support bar, each said mounting plate defining a slot to receive a said axle and providing means for orienting the support bar relative to the mounting plates.

21. An assembly in accordance with claim 20, and wherein said orienting means comprises a formation on said mounting plate for engaging said support bar.

22. An assembly in accordance with claim 21, and wherein enlarged stop defines a chordal flat and said formation on said mounting plate engages said chordal flat.

23. An assembly in accordance with claim 22 and wherein said bicycle hangers comprise two-point bicycle hangers.

* * * * *